(12) United States Patent
Hagano (10) Patent No.: US 8,539,993 B2
(45) Date of Patent: Sep. 24, 2013

(54) FUEL TANK OPENING AND CLOSING DEVICE

(75) Inventor: Hiroyuki Hagano, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/070,545

(22) Filed: Mar. 24, 2011

(65) Prior Publication Data

US 2011/0240640 A1    Oct. 6, 2011

(30) Foreign Application Priority Data

Mar. 31, 2010  (JP) ................................. 2010-080258
Mar. 31, 2010  (JP) ................................. 2010-080261

(51) Int. Cl.
 B65B 1/04    (2006.01)
 B65B 3/00    (2006.01)
(52) U.S. Cl.
 USPC ........... 141/350; 141/302; 141/348; 220/86.2
(58) Field of Classification Search
 USPC ......... 141/348–350, 386, 301–302; 220/86.2
 See application file for complete search history.

(56) References Cited

U.S. PATENT DOCUMENTS

| | | | |
|---|---|---|---|
| 5,186,220 A | | 2/1993 | Scharrer |
| 5,921,297 A | * | 7/1999 | Kremer et al. ................ 141/383 |
| 6,102,234 A | * | 8/2000 | Kremer et al. ................ 220/86.2 |
| 6,279,626 B1 | * | 8/2001 | Schmitt et al. ................ 141/348 |
| RE37,776 E | * | 7/2002 | Foltz ............................ 220/86.2 |
| 6,446,826 B1 | * | 9/2002 | Foltz et al. ................... 220/86.2 |
| 6,474,376 B2 | * | 11/2002 | Hagano et al. ................ 141/350 |
| 6,923,224 B1 | * | 8/2005 | McClung et al. ............. 141/350 |
| 6,968,874 B1 | * | 11/2005 | Gabbey et al. ................ 141/349 |
| 7,661,550 B2 | * | 2/2010 | Feichtinger .................. 220/86.2 |
| 7,762,291 B2 | * | 7/2010 | Martin et al. ................. 141/350 |
| 7,967,041 B2 | * | 6/2011 | Groom et al. ................. 141/367 |
| 2009/0139606 A1 | * | 6/2009 | Peddle et al. ................. 141/350 |
| 2010/0012223 A1 | * | 1/2010 | Yoshida ....................... 141/350 |

FOREIGN PATENT DOCUMENTS

| | | |
|---|---|---|
| JP | 2007-331518 A | 12/2007 |
| WO | WO 00/02778 | 1/2000 |
| WO | WO 2006/111817 A1 | 10/2006 |

* cited by examiner

Primary Examiner — Timothy L Maust
Assistant Examiner — Timothy P Kelly
(74) Attorney, Agent, or Firm — Posz Law Group, PLC (57) ABSTRACT

A fuel tank opening and closing device is equipped with a flap valve mechanism having an opening and closing member for opening and closing an inlet inside a tank opening forming member. The nozzle positioning guide mechanism has a first support mechanism of an opening peripheral edge of an introduction port of an insertion path of a tank opening forming member, a second support mechanism having an introduction guide surface formed on the top surface of the pressing member of the opening and closing member, and a positioning ridge line that has a curvature almost the same but slightly larger than the outer diameter of the fueling nozzle and which touches by line contact on the outer peripheral surface of the fueling nozzle at the insertion completion position, and a third support mechanism having a valve positioning member which regulates the degree of openness of the opening and closing member by touching the inner wall of the tank opening forming member.

20 Claims, 10 Drawing Sheets

FUEL TANK OPENING AND CLOSING DEVICE

This application claims the benefit of and priority from Japanese Applications No. 2010-80258 filed Mar. 31, 2010, and No. 2010-80261 filed Mar. 31, 2010, and the contents of which are incorporated herein by reference.

BACKGROUND OF THE INVENTION

1. Field of the Invention

The present invention relates to a fuel tank opening and closing device for opening a flap valve using the insertion force of a fueling nozzle to fuel a fuel tank.

2. Description of the Related Art

A example of a related fuel tank opening and closing mechanism includes a flap valve mechanism provided at the fuel cap, disclosed in JP-A 2007-331518. The flap valve mechanism is sealed by closing the inlet of the fuel path using the flap valve as well as by energization using a spring. The flap valve mechanism opens the inlet by pressing the flap valve against the spring energization force using the fueling nozzle during fueling. When fuel is injected from the fueling nozzle, the fuel rises in the fuel path and touches the sensor provided in the fueling nozzle, fuel stops automatically.

With the fuel tank opening and closing device, because the opening operation is done by pressing the flap valve with the tip of the fueling nozzle, the fueling nozzle sways easily during insertion, and there are times when the insertion work cannot be done smoothly. During fueling, as the fueling nozzle is insufficiently positioned at the outer edge of the inlet, the fueling nozzle sways easily, the sensor erroneously operates auto stop due to airborne droplets of fuel, and there were cases of trouble with fueling.

SUMMARY

An advantage of some aspects of the invention is to provide a fuel tank opening and closing device that can realize positioning of the fueling nozzle during fueling with a simple constitution.

According to an aspect of the invention, there is to provide a fuel tank opening and closing device for opening and closing a path for supplying fuel to a fuel tank. The fuel tank opening and closing device comprising: a tank opening forming member that forms a fuel path connected to the fuel tank, an insertion path having an introduction port and connected the introduction port to the fuel path for inserting a fueling nozzle and an inlet disposed between the fuel path and the insertion path; a flap valve mechanism that is arranged inside the tank opening forming member, and has an opening and closing member for opening and closing the inlet by being pressed by an end of the fueling nozzle; and a nozzle positioning guide mechanism that guides the fueling nozzle from the introduction port to an insertion completion position through the insertion path, the inlet opened by the opening and closing member and the fuel path, and positions the fueling nozzle at the insertion completion position, wherein the insertion completion position is a position at which fuel is supplied by the fueling nozzle in the fuel path. The nozzle positioning guide mechanism includes: a first support mechanism that is formed on an opening peripheral edge of the introduction port, which guides the fueling nozzle in an insertion direction while contacting with an outer periphery part of the fueling nozzle, and positions the fueling nozzle at the insertion completion position, a second support mechanism that has an introduction guide surface and a positioning ridge line formed on an upper surface of the opening and closing member respectively, wherein the introduction guide surface is formed with a curvature greater than an radius of the fueling nozzle, and conveys force in a direction for opening the opening and closing member while sliding the end of the fueling nozzle, and wherein the positioning ridge line is formed to touch by line contact the outer periphery surface of the fueling nozzle at the insertion completion position, the positioning ridge line having almost the same curvature as the radius of the fueling nozzle, and a third support mechanism that is formed on the opening and closing member, and has a valve positioning member which regulates a degree of openness of the opening and closing member by touching an inner wall of the tank opening forming member at the insertion completion position.

With the fuel tank opening and closing device of application example 1, the fueling nozzle is inserted from the insertion path of the aperture forming member, and when the tip of the fueling nozzle presses on the opening and closing member to press the fueling nozzle in, the opening and closing member of the flap valve mechanism opens, and furthermore, the fueling nozzle is inserted through the inlet for fueling to the fuel path.

Using the nozzle positioning guide mechanism, the fueling nozzle is guided in the insertion direction, and furthermore, when it reaches the insertion completion position, it is positioned inside the fuel path. Specifically, a first support mechanism of the nozzle positioning guide mechanism is formed at the aperture outer edge of the introduction port of the insertion path of the tank opening forming member, and while sliding the outer periphery part of the fueling nozzle, the fueling nozzle is guided in the insertion direction. Also, with a second support mechanism, while an introduction guide surface of the guide curved surface on the pressing member of the opening and closing member guides the tip of the fueling nozzle, the operation of opening the opening and closing member is done, and the inlet is opened, making it possible to more easily insert the fueling nozzle. Then, when the fueling nozzle is inserted up to the insertion completion position, the opening and closing member valve positioning member touches the inner wall of the tank opening forming member, and any further opening operation is stopped. At this time, the fueling nozzle is supported by the aperture outer edge part of the introduction port of the tank opening forming member, and furthermore, the outer periphery part of the fueling nozzle of the opening and closing member is positioned in the left and right direction in relation to the insertion direction by the positioning ridge line, and furthermore, this touches the valve positioning member of the opening and closing member and positions it in the vertical direction in relation to the insertion direction.

Therefore, when doing fueling, the fueling nozzle is guided by the nozzle positioning guide mechanism until the opening and closing member is opened from the insertion path and it reaches the insertion completion position, without swaying, so it is possible to do a simple insertion task smoothly. In fact, the fueling nozzle is positioned in relation to the insertion direction at three locations by the insertion completion position, so there is no imprudent operation of the auto stop due to contact of the fuel within the fuel path.

The first support mechanism of application example 2 can be constituted having a nozzle stopper for engaging with the nozzle locking part that projects from the outer periphery part of the fueling nozzle noted above. With this constitution, the movement of the fueling nozzle in the pull out direction is regulated, and it is possible to hold the fueling nozzle in the tank opening forming member without holding by hand, making the fueling task easy.

The valve positioning member of the third support mechanism of application example 3 can have a constitution having a curved abutting part that touches the inner wall of the cylinder of the aforementioned tank opening forming member. With this constitution, the valve positioning member is supported in a state with its abutting part closely adhered to the tank opening forming member, so the fueling nozzle is reliably supported on the opening and closing member, and it is possible to further prevent shakiness at the insertion completion position.

Equipped with an opening and closing activation mechanism for putting the flap valve mechanism of the application example 4 in the locked position as well as putting the aforementioned flap valve mechanism at the unlocked position when pressed by the aforementioned fueling nozzle, the aforementioned opening and closing activation mechanism can be constituted to be equipped with a nozzle detection mechanism arranged in the aforementioned insertion path and having an introduction pressing part for receiving the movement force in the insertion direction by the aforementioned fueling nozzle, and a lock mechanism having a lock member that selectively takes a locked position for locking the opening operation of the aforementioned opening and closing member and an unlocked position for allowing the opening operation of the aforementioned opening and closing member, and that couples with the aforementioned introduction pressing part and moves the aforementioned lock member from the aforementioned locked position to the aforementioned unlocked position. This kind of nozzle positioning guide mechanism can be optimally handled regardless of whether or not there is a nozzle detection mechanism.

With the fuel tank opening and closing device of application example 1, the fueling nozzle is inserted from the insertion path of the tank opening forming member, and when the pressing member of the opening and closing member that constitutes the flap valve mechanism is pressed by the tip of the fueling nozzle, the opening and closing member opening operation is performed, and by doing this, fueling to the fuel path is performed from the fueling nozzle.

Also, the application example 1 tank opening forming member and pressing member are formed from a conductive material having conductivity, and constitute a grounding path to the vehicle body side member of a vehicle. When the fueling nozzle touches the pressing member by insertion to the insertion path, it is connected to a grounding path from a first gap between the outer periphery part of the pressing member and the inner wall of the tank opening forming member, via a discharge projection forming a narrow second gap, and furthermore, to a vehicle body side member via the tank opening forming member. Thus, even if the person holding the fueling nozzle is charged with static electricity, the static electricity is removed quickly through the grounding path. In this way, to ensure a grounding path of the fuel tank opening and closing device, a pressing member contacted by the fueling nozzle tip is used, so it is not necessary to provide a separate grounding member as it was with the prior art, making the constitution simple. Also, before the fueling nozzle opens the opening and closing member, since it touches the pressing member, there is no discharging on the fuel tank side from the opening and closing member.

With application example 2, the aforementioned pressing member and the tank opening forming member can be formed from conductive resin. When forming the tank opening forming member and the pressing member using resin in this way, charging occurs easily, but by forming part of the pressing member or the like using conductive resin, it is possible to realize a grounding path that can remove the charge reliably.

These and other objects, features, aspects, and advantages of the present invention will become more apparent from the following detailed description of the preferred embodiments with the accompanying drawings.

Figure 1:
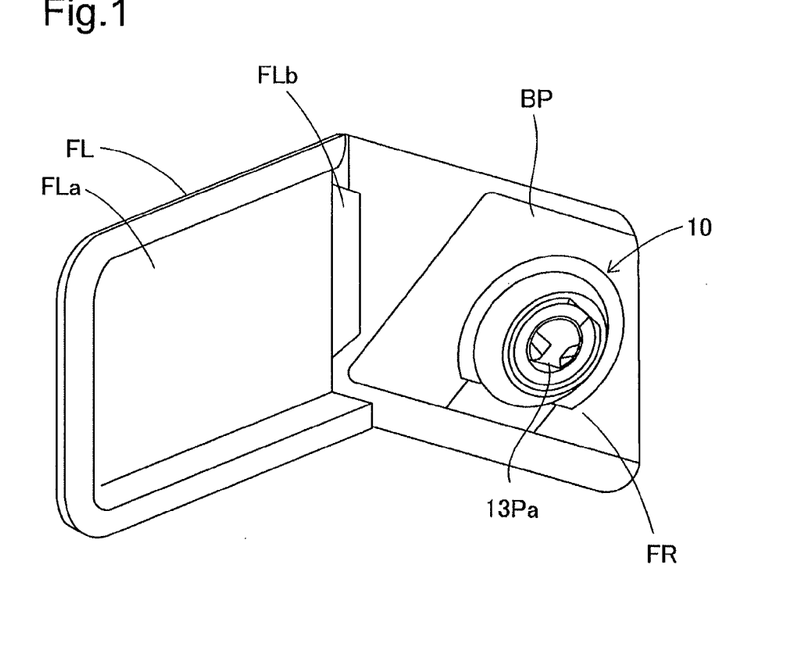
FIG. 1 is a perspective view showing the back part of a vehicle using the fuel tank opening and closing device of an embodiment of the present invention, and shows a state with the fueling lid open.

DESCRIPTION OF THE PREFERRED EMBODIMENTS (1) General Constitution of the Fuel Tank Opening and Closing Device FIG. 1 shows the back part of a vehicle using the fuel tank opening and closing device of an embodiment of the present invention. At the back part of the car body of the vehicle, a fueling lid FL for fueling fuel (light oil) is supported to be able to open and close. The fueling lid FL is supported so that the lid main body FLa following the outer panel of the car body is able to open and close at the outer panel of the car body via the hinge FLb. The space that opens for the fueling lid FL becomes the fueling chamber FR, and inside this fueling chamber FR is placed the fueling tank opening and closing device 10 supported on a base plate BP. The fuel tank opening and closing device 10 is a mechanism for supplying fuel to the fuel tank without using a fuel cap, and it is a mechanism that, after the fueling lid FL is opened, supplies fuel to the fuel tank from the fueling nozzle by opening the fuel path with external force from the fueling nozzle. Following, we will give a detailed description of the constitution of the fuel tank opening and closing device.

(2) Constitution and Operation of Each Part

Figure 2:
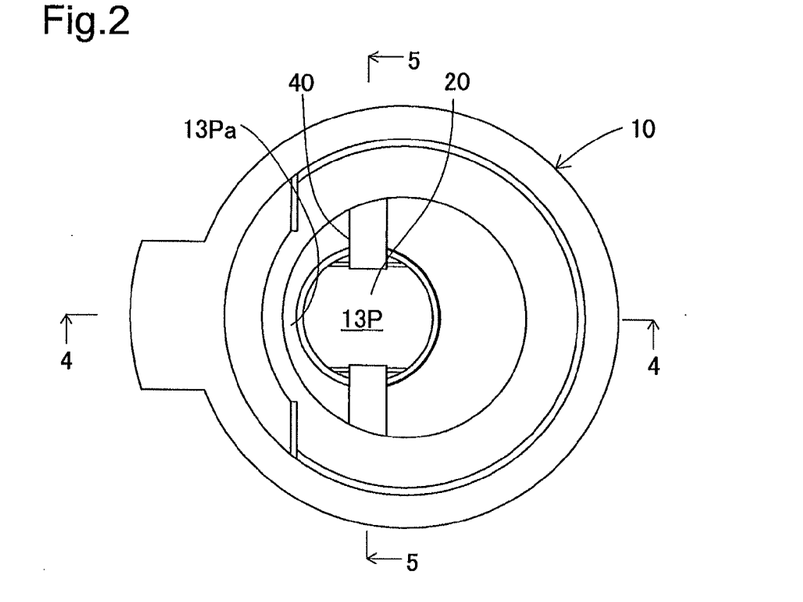
FIG. 2 is a plan view showing the aperture part of the fuel tank opening and closing device.
Figure 3:
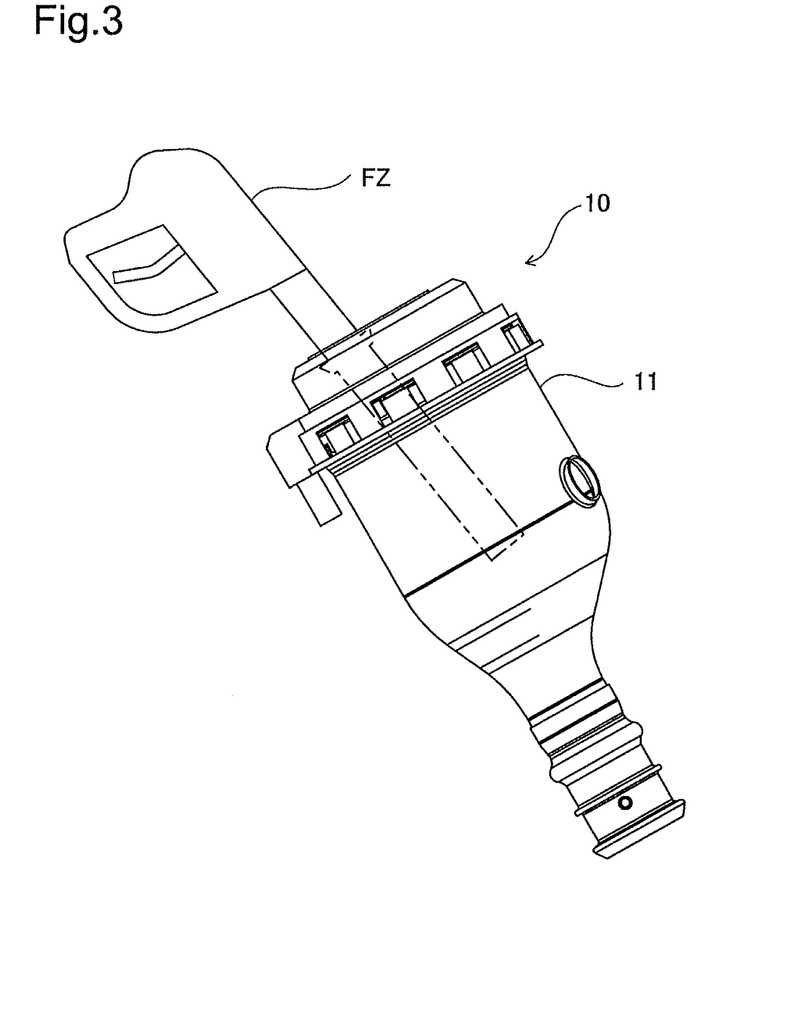
FIG. 3 is an external view showing the fuel tank opening and closing device during fueling.
Figure 4:
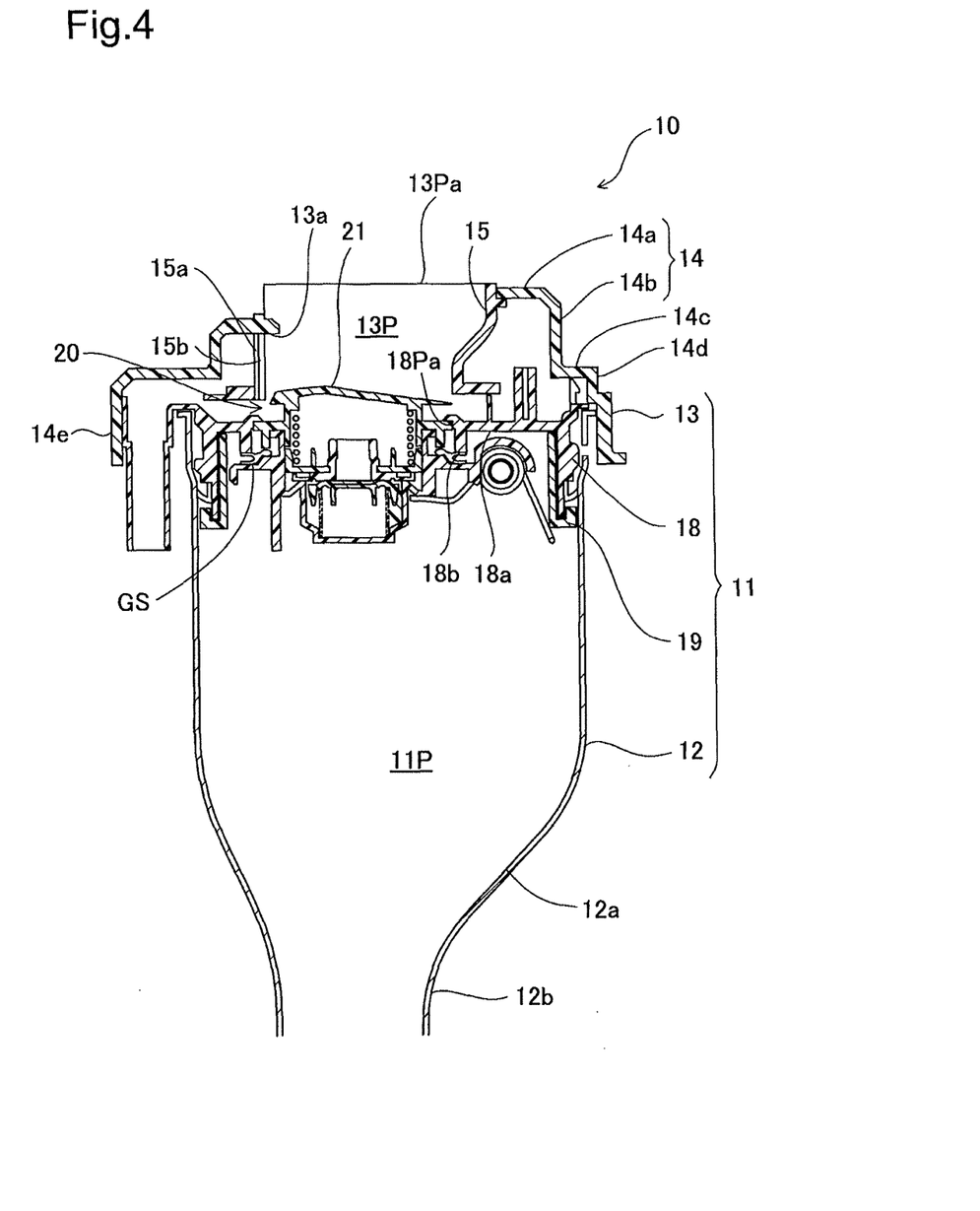
FIG. 4 is a cross section diagram along line 4-4 of FIG. 2.
Figure 5:
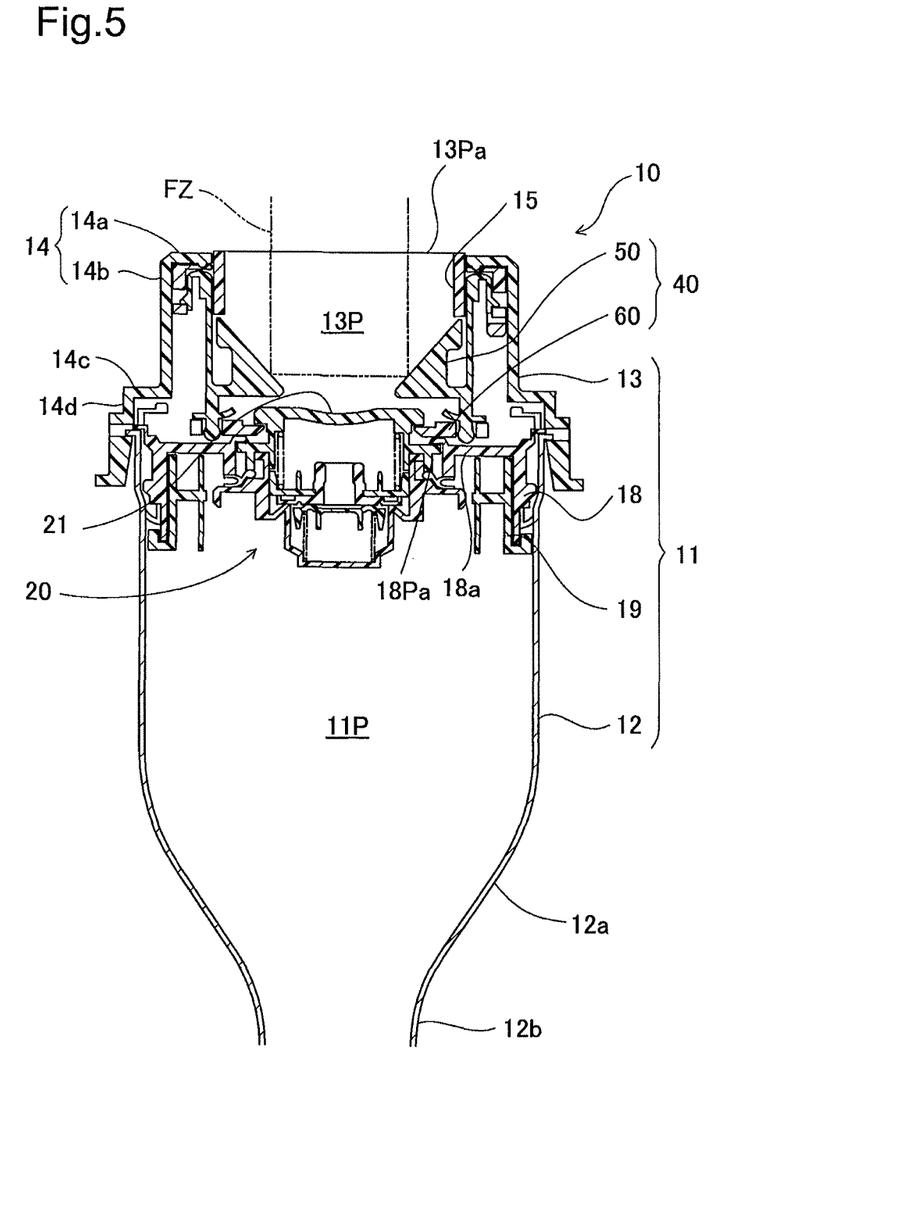
FIG. 5 is a cross section diagram along line 5-5 of FIG. 2.

FIG. 2 is a plan view showing the aperture part of the fuel tank opening and closing device 10, FIG. 3 is an external view of the fuel tank opening and closing device 10 during fueling, and FIG. 4 is a cross section diagram along line 5-5 of FIG. 2. In FIG. 4 and FIG. 5, the fuel tank opening and closing device 10 is equipped with a tank opening forming member 11 having a fuel path 11P connected to the fuel tank (not illustrated), a flap valve mechanism 20, and an opening and closing activation mechanism 40 for opening and closing the flap valve mechanism 20.

(2)-1 Tank Opening Forming Member 11

In FIG. 4, the tank opening forming member 11 is a tube unit having a fuel path 11P, and is equipped with a metal connecting tube 12 connected to the fuel tank, an aperture forming member 13 fixed on the top part of the connecting tube 12, an inlet forming member 18 mounted on the top part of the connecting tube 12, and a fitting part 19 for fixing the inlet forming member 18 to the connecting tube 12.

The connecting tube 12 is equipped with a reduced diameter part 12a for which the fuel tank side is gradually reduced in diameter, and a straight tube part 12b connected to the reduced diameter part 12a, and these form a single unit. The aperture forming member 13 is equipped with a cylindrical outer wall 14 on the top part of the connecting tube 12, and an inner wall 15 arranged inside the outer wall 14, forming an insertion path 13P for inserting the fuel nozzle FZ.

The outer wall 14 is equipped with a top surface part 14a and a side surface part 14b forming the introduction port 13Pa, which is formed in a cup shape. The bottom part of the outer wall 14 becomes a bottom part cylinder part 14d from the slightly broadened in diameter broadened diameter part 14c. Also, at part of the broadened diameter part 14c, an ejection upper tube 14e for ejecting fuel that overflowed during fueling from the insertion path 13P is provided projecting downward.

The inner wall 15 is a wall surface forming the insertion path 13P, and the introduction port 13Pa is formed at that aperture part. Also, a nozzle stopper 13a is formed at the a aperture edge part of the introduction port 13P and the top part of the inner wall 15. Also, a plurality of rows of slits 15a are formed in the insertion direction at the inner wall 15. The slit 15a forms a path connecting from the insertion path 13P to the ejection upper tube 14e, and prevents fuel from pooling in the insertion path 13P.

The inlet forming member 18 is fixed to the top part of the connecting tube 12 by engaging with the fitting part 19 formed in a tube shape, this is a member for supporting part of the flap valve mechanism 20, and is equipped with a circular plate part 18a having an inlet 18Pa which forms part of the fuel path 11P.

(2)-2 Flap Valve Mechanism 20

Figure 6:
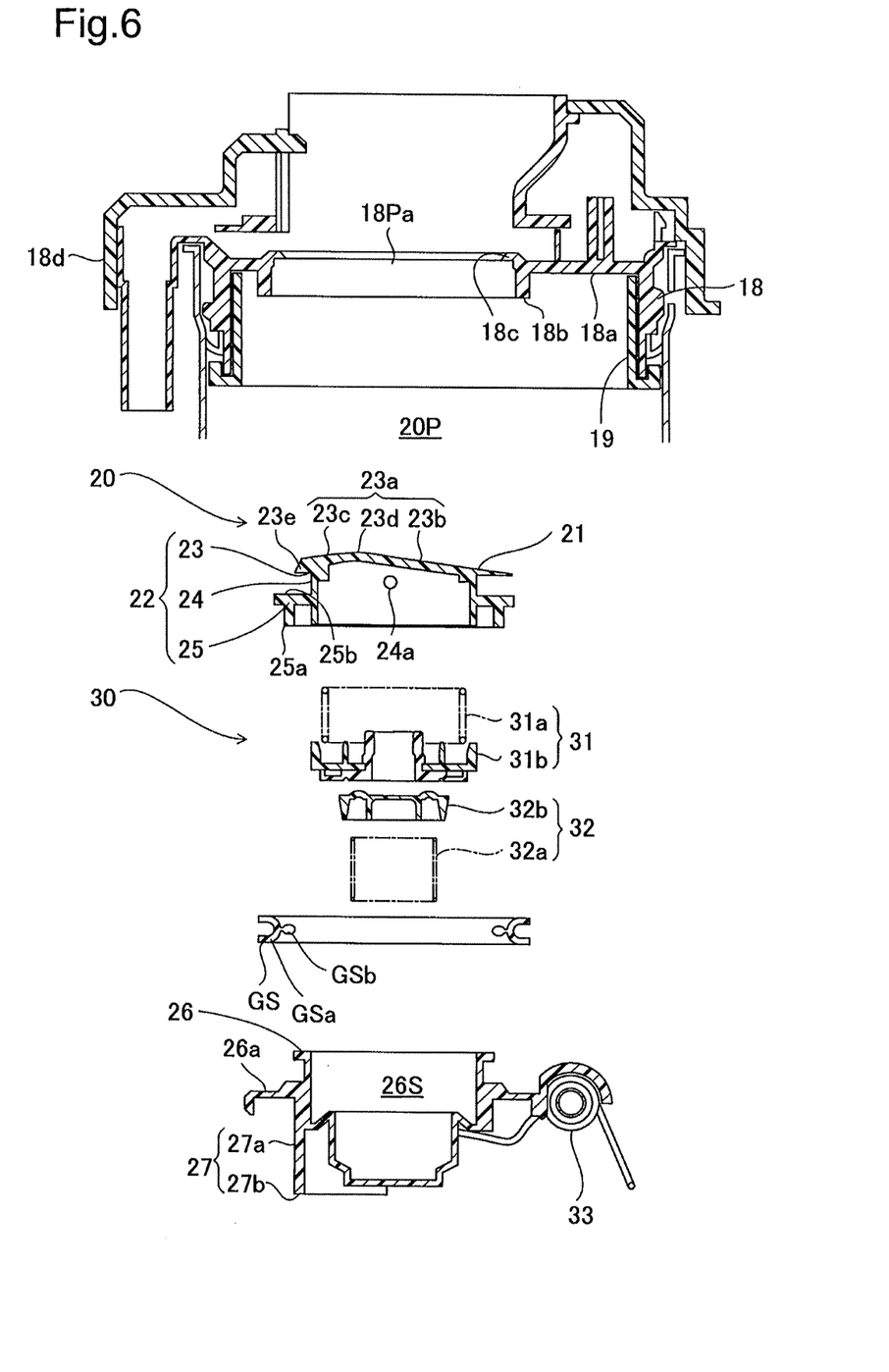
FIG. 6 is a cross section exploded view of the peripheral part of the flap valve mechanism.

FIG. 6 is an exploded cross section view of the flap valve mechanism 20. The flap valve mechanism 20 is equipped with an opening and closing member 21, a spring 33, and a gasket GS. The opening and closing member 21 is axially supported on the inlet forming member 18, and is a member for opening and closing the inlet 18Pa. The spring 33 is a coil spring, one end part of that coil shape is supported on the inlet forming member 18, and the other end part is supported on the opening and closing member 21 and energized in the direction that closes the opening and closing member 21. The opening and closing member 21 is equipped with a pressing member 22, a valve chamber forming member 26, a pressure regulating valve 30, and the gasket GS.

Figure 7:
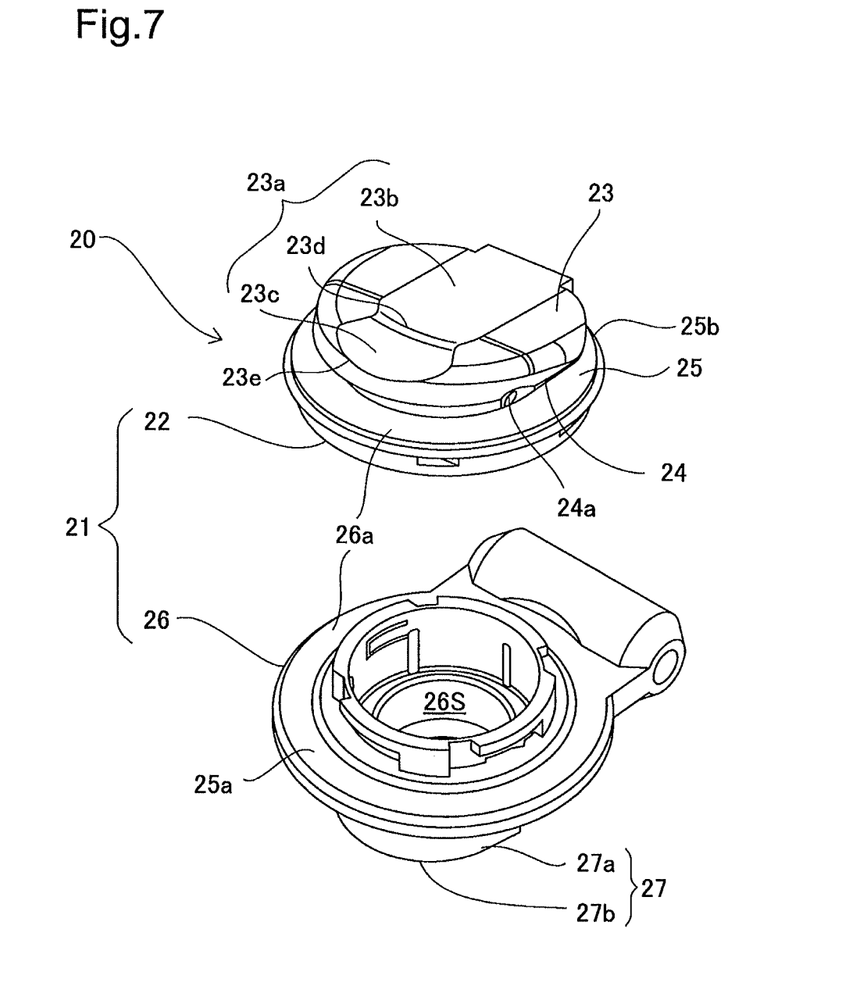
FIG. 7 is a perspective exploded view of part of the flap valve mechanism.

FIG. 7 is an exploded perspective view of part of the flap valve mechanism 20. The pressing member 22 is an almost tube shaped member with a bottom that directly receives the pressing force of the fueling nozzle FZ, it is formed from a conductive resin, and is formed by a top surface part 23, a side wall 24 provided projecting from the outer periphery of the top surface part 23, and a flange 25. On the top surface part 23 is formed a guide curved surface 23a for smoothing the touching with the fueling nozzle FZ and also for positioning the fueling nozzle FZ. The guide curved surface 23a is equipped with an introduction guide surface 23b and a tilted guide surface 23c, and between that is the positioning ridge line 23d. Moreover, the nozzle positioning guide mechanism for the guide curved surface 23a will be described later. A ventilation hole 24a is formed on the side wall 24, and this passes air to the pressure regulating valve 30. The flange 25 has a pressing side stopper 25b, and by touching the opening side stopper 18c of the inlet forming member 18, in a state with the opening and closing member 21 closed, it prevents infiltration of rain water or the like to the inside by eliminating the gap with the inlet 18Pa.

The valve chamber forming member 26 is a cap shape, and forms a valve chamber 26S that houses the pressure regulating valve 30. A flange 26a is formed at the outer periphery part of the valve chamber forming member 26. The gasket GS is formed from a rubber material, and is equipped with a C shaped seal main unit GSa, and a support part GSb of the inner periphery part of the seal main unit GSa, the support part GSb is held by being sandwiched between the top surface of the inner periphery side of the flange 26a and the seal pressing part 25a of the flange 25, and the top surface of that outer periphery side seals the inlet 18Pa by compressing the gasket GS with the seal part 18b.

The pressure regulating valve 30 is housed inside the valve chamber 26S that is surrounded by the pressing member 22 and the valve chamber forming member 26 and connected to the ventilation hole 24a, and it is equipped with a positive pressure valve 31 having a positive pressure valve unit 31b energized by the spring 31a and a negative pressure valve 32 having a negative pressure valve unit 32b energized by the spring 32a, and for the fuel tank pressure, the tank internal pressure of the fuel tank is adjusted to within a specified range by opening and closing both valve units.

(2)-3 Fueling Nozzle FZ Positioning Mechanism

Figure 8:
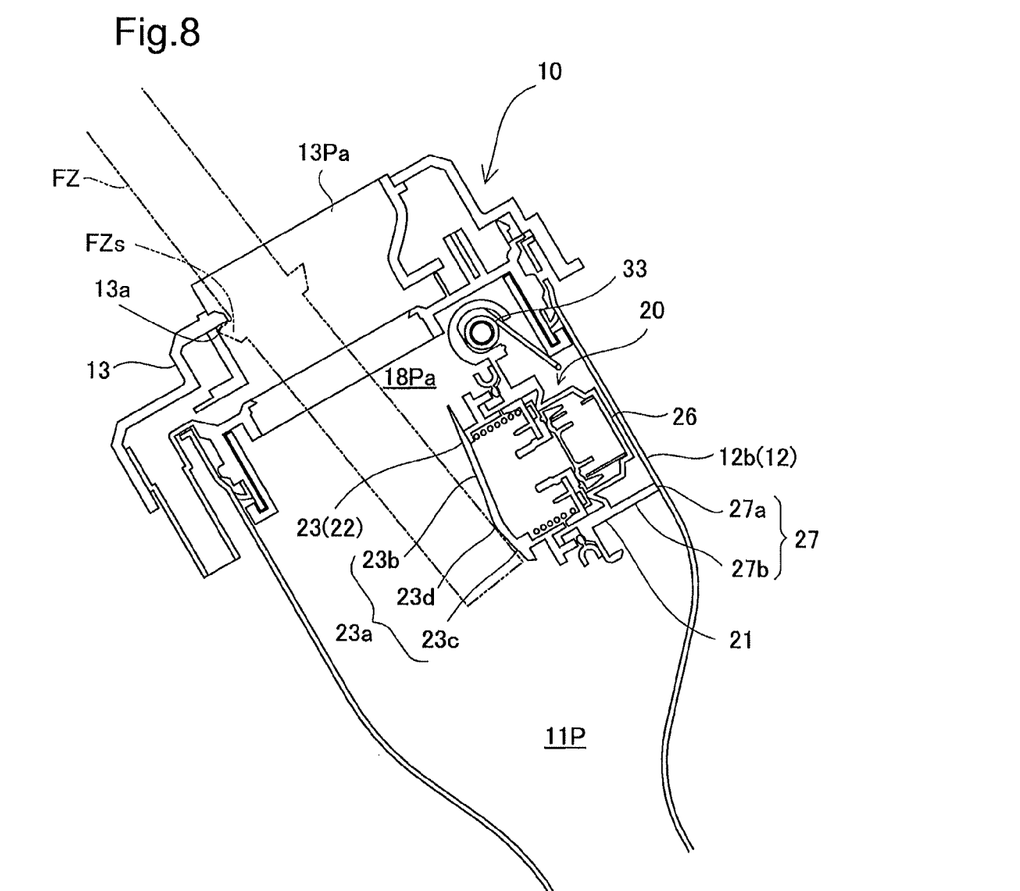
FIG. 8 shows the state of fueling with the fuel tank opening and closing device.
Figure 9:
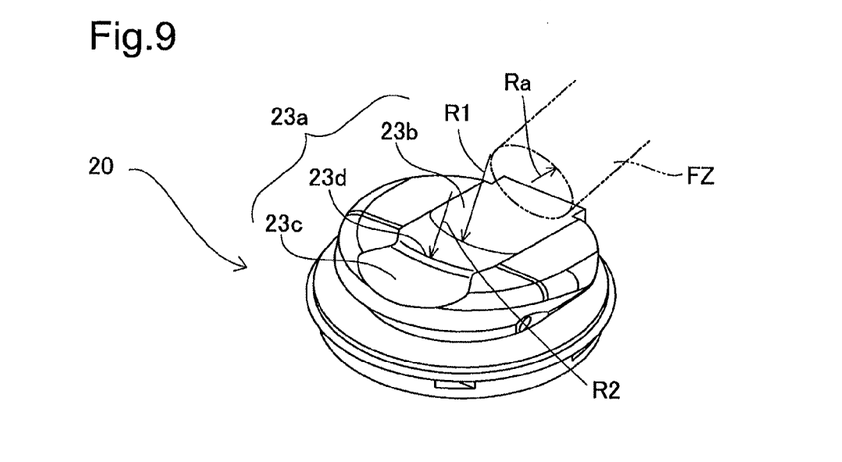
FIG. 9 shows the second support mechanism of the nozzle positioning guide mechanism of the flap valve mechanism.
Figure 10:
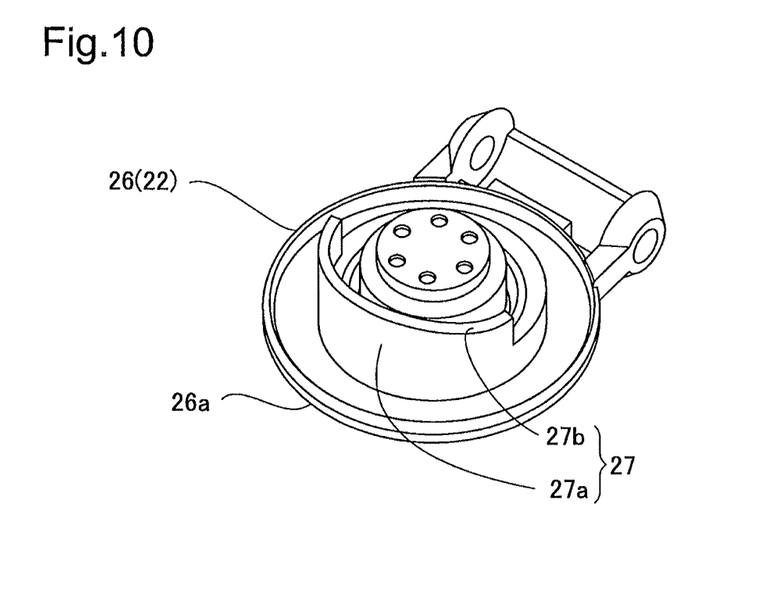
FIG. 10 shows the third support mechanism of the nozzle positioning guide mechanism of the flap valve mechanism.

FIG. 8 shows the state of fueling to the fuel tank opening and closing device 10. A positioning mechanism for positioning the fueling nozzle FZ during fueling is formed on the fuel tank opening and closing device 10. The positioning mechanism is constituted by cooperation of each member of the aperture forming member 13, the top surface part 23 of the flap valve mechanism 20, and the valve positioning member 27. Specifically, the nozzle stopper 13a for positioning the fueling nozzle FZ in the insertion direction (pull out direction) by engaging with the nozzle locking part FZs of the fueling nozzle FZ is formed on the opening peripheral edge of an introduction port 13Pa of the aperture forming member 13 (first support mechanism). Also, on the guide curved surface 23a of the top surface part 23 is formed a positioning ridge line positioning ridge line 23d for positioning the tip of the fueling nozzle FZ, after it is guided along the introduction guide surface 23b, in the left right direction (horizontal direction) of the fueling nozzle FZ by touching the outer peripheral surface of the fueling nozzle FZ (second support mechanism). The curvature of the guide curved surface 23a and the positioning ridge line 23d are determined considering the radius Ra of the fueling nozzle FZ, specifically, being formed to follow the outer shape of the fueling nozzle FZ, so that when the radius of the introduction guide surface 23b is R1, and the radius of the positioning ridge line 23d is R2, the radius Ra is larger than radius Ra, and radius R2 is almost the same but slightly larger than radius Ra. Furthermore, as shown in FIG. 10, a semi-cylinder valve positioning member 27 is formed at the bottom part of the valve chamber forming member 26 of the pressing member 22 (third support mechanism). The valve positioning member 27 has a positioning main unit 27a and an abutting part 27b curved at the edge surface of the valve positioning member 27, and as shown in FIG. 8, by the abutting part 27b touching the straight tube part 12b of the connecting tube 12, the closing member 21, even when pressed on the fueling nozzle FZ, does not have its degree of openness become any greater. Thus, the fueling nozzle FZ positioned by the positioning ridge line 23d is positioned in the vertical direction.

(2)-4 Grounding Path

Figure 11:
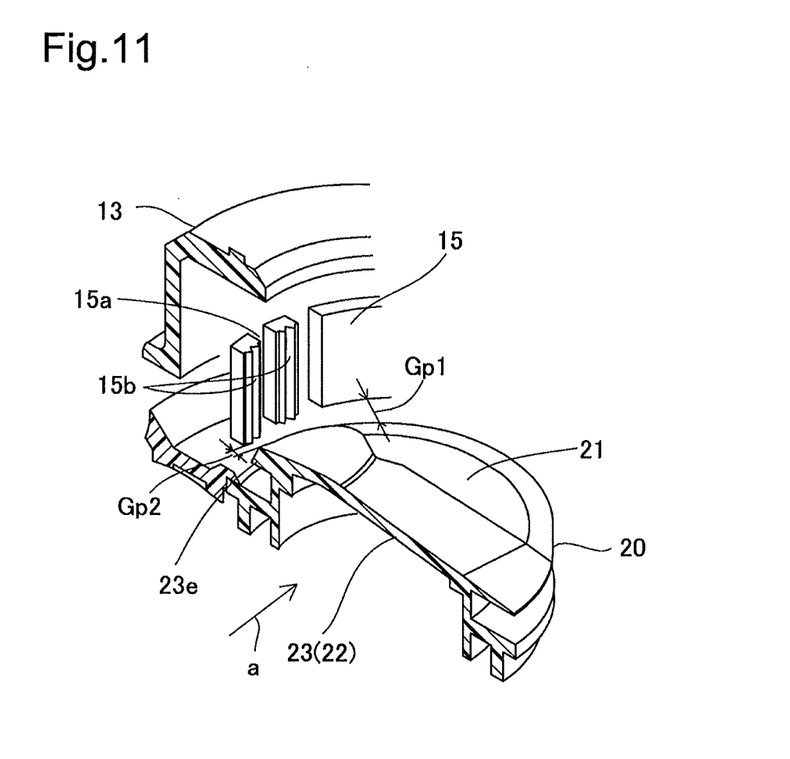
FIG. 11 shows the grounding path of the flap valve mechanism.
Figure 12:
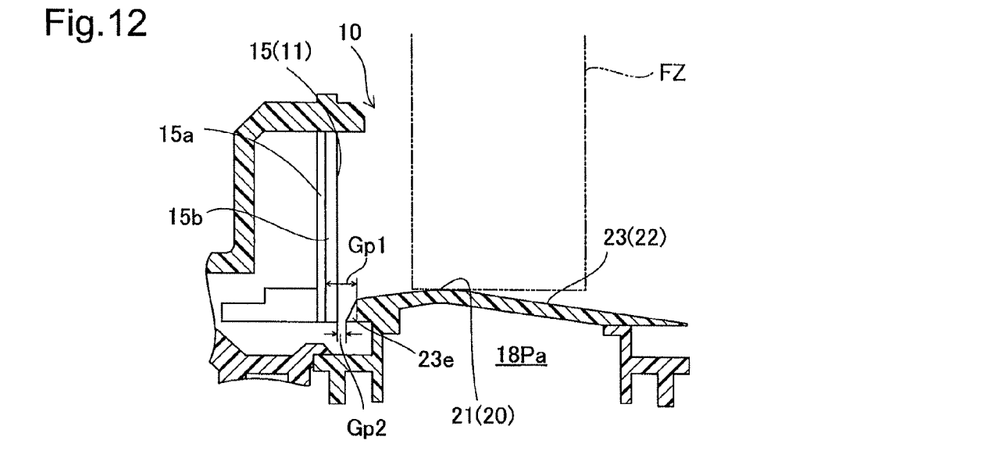
FIG. 12 is a view seen from the arrow direction a of FIG. 11.

In FIG. 4, by having part of the aperture forming member 13 and the opening and closing member 21 formed from a conductive member, a grounding path is constituted that releases the static electricity that occurs during fueling to the car body side member through the fueling nozzle FZ or the metal connecting tube 12. FIG. 11 is a perspective view of the vicinity of the flap valve mechanism with part cut away, and FIG. 12 is a view seen from the arrow direction a of FIG. 11. The pressing member 22 of the opening and closing member 21 has at least the surface formed using a conductive material, and its tip part is the discharge projection 23e. Also, a discharge projection 15b is formed in a rib shape at the inner wall 15 of the aperture forming member 13 facing opposite the discharge projection 23e. In a state with the opening and closing member 21 closed, with the gap between the outer periphery part of the pressing member 22 and the inner wall 15 as Gp1, and the gap between the discharge projection 23e and the discharge projection 15b as GP2, this is formed with Gp1>Gp2. Specifically, the gap Gp2 is set to 0.5 mm or less, and discharge is possible by insulation destruction in the air. The conductive material forming the aperture forming member 13 and the pressing member 22 is obtained by using one or combining a plurality of conductive whisker, conductive carbon, or conductive graphite powder and mixing this in resin, for example to 100 weight parts polyacetal or polyamide (PA) are mixed 5 weight parts conductive whisker and 10 weight parts conductive carbon. Here, as a conductive whisker, (commercial name Dentall: made by Otsuka Kagaku) can be used, and as the conductive carbon, (commercial name Vulcan XC-72: made by Cabot Corp.) can be used. Note that as a resin for giving conductivity, in addition to polyacetal and polyamide, it is also possible to use any material that is excellent in terms of fuel resistance and fuel permeation resistance, for example fluorine resin (ETFE) or the like.

(2)-5 Opening and Closing Activation Mechanism 40

In FIG. 5, the opening and closing activation mechanism 40 is placed above and at the side of the opening and closing member 21 of the flap valve mechanism 20, and is a mechanism for performing the opening operation by being pressed by the tip of the fueling nozzle FZ, and as a major constitution of this, is equipped with a nozzle detection mechanism 50 and a locking mechanism 60.

Figure 13:
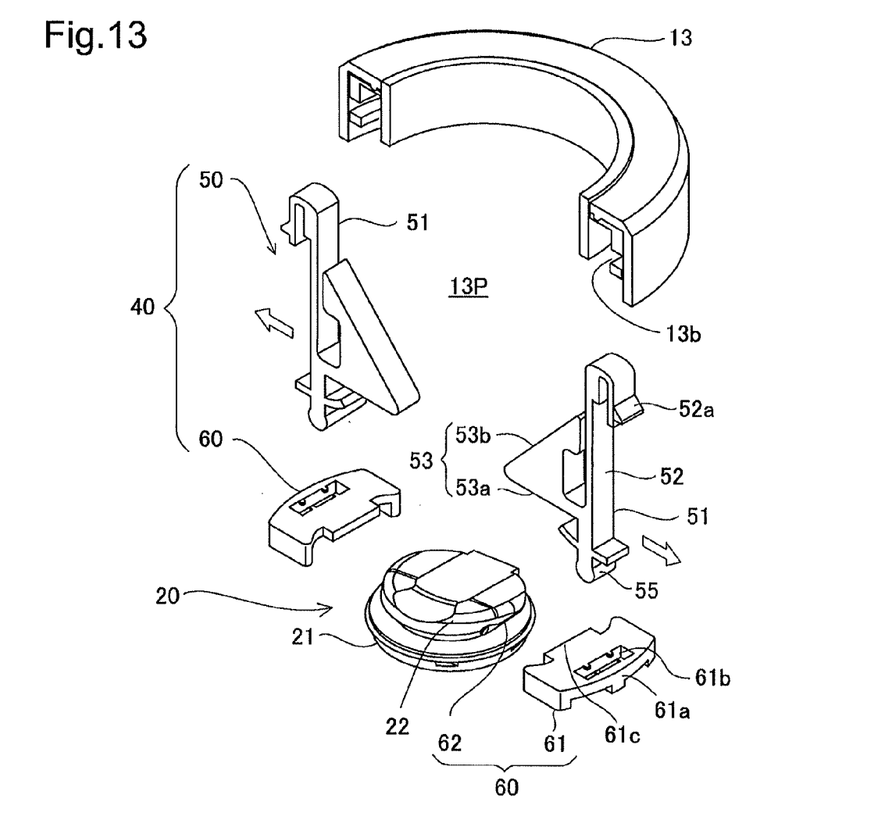
FIG. 13 is an exploded perspective view of the opening and closing activation mechanism.

FIG. 13 is an exploded perspective view of the opening and closing activation mechanism 40. In FIG. 5 and FIG. 13, the nozzle detection mechanism 50 is a mechanism that releases the locked position of the opening and closing member 21 of the flap valve mechanism 20 via the locking mechanism 60 by being pressed by the tip of the fueling nozzle FZ of a specified outer diameter, and it is equipped with nozzle detection members 51 supported on the aperture forming member 13. Each of the nozzle detection member 51 is equipped with a detection support unit 52 having an engaged claw 52a which is engaged with the engaging part 13b of the aperture forming member 13, an introduction pressing part 53 provided projecting from the lower part of the detection support unit 52 facing the insertion path 13P, and arranged at both sides of that, and an engaging cylindrical part 55 provided projecting at the bottom part of the introduction pressing part 53, and these are formed as a single unit. Each introduction pressing part 53 is equipped with a pressing support unit 53a, and a pressing incline 53b tilted in accordance with facing the insertion path 13P side from the pressing support unit 53a and facing downward. The pressing incline 53b is placed so as to be pressed by the tip of the fueling nozzle when the outer diameter of the tip of the fueling nozzle FZ is a specified diameter or greater. When the pressing incline 53b is pressed by the fueling nozzle FZ, the detection support unit 52 is elastically deformed in the outer diameter direction, and acts as a spring.

The locking mechanism 60 is equipped with a lock member 61 and a locked part 62 formed by a recess on the opening and closing member 21. The lock member 61 is equipped with a lock member main unit 61a which is a round arc shaped member, an engaging recess 61b that engages with the engaging cylindrical part 55 formed on the lock member main unit 61a, and a lock engaging part 61c provided projecting at the inner periphery side of the lock member main unit 61a. The locked part 62 is formed at the bottom part of the pressing member 22 of the opening and closing member 21, and is a site for engaging with the lock engaging part 61c, and by the lock engaging part 61c engaging with the locked part 62, this becomes a locked position that regulates the opening operation of the opening and closing member 21, and by moving from the center direction of the opening and closing member 21 to the diameter outward direction, it is released from the locked part 62, and becomes the unlocked position, allowing the opening operation of the opening and closing member 21.

Figure 14:
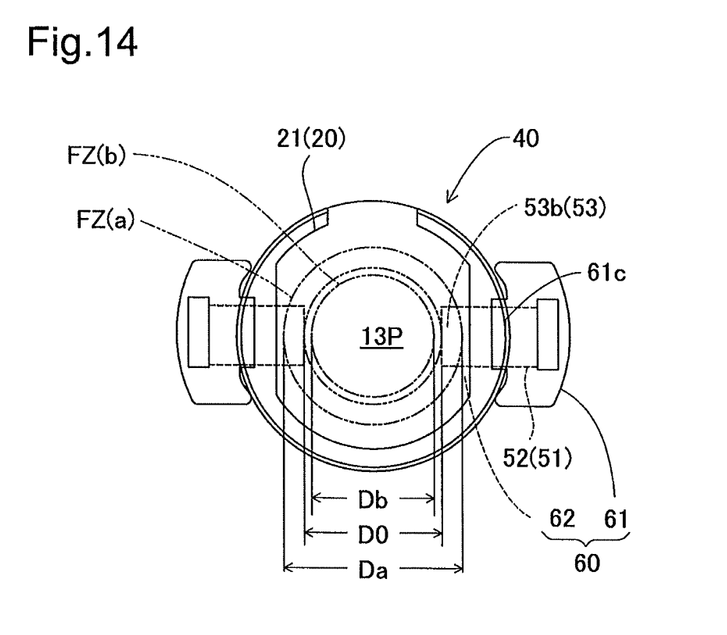
FIG. 14 shows the operation of the opening and closing activation mechanism.
Figure 15:
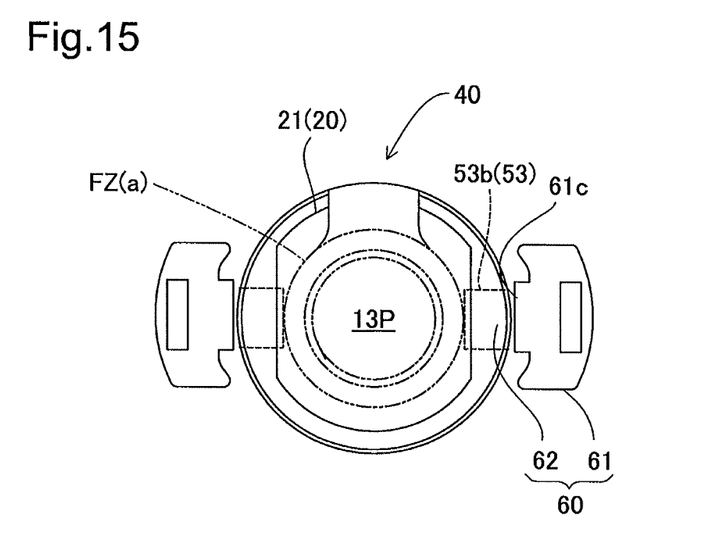
FIG. 15 shows the operation of the opening and closing activation mechanism.

FIG. 14 and FIG. 15 show the nozzle detection mechanism 50, where FIG. 14 shows the state before inserting the fueling nozzle, and FIG. 15 shows the state with the fueling nozzle inserted. Specifically, when the inner diameter of the insertion path 13P formed by the inner edges facing opposite the introduction pressing part 53 is D0, the outer diameter of the tip of the light oil fueling nozzle (FZa) is Da, and the gasoline fueling nozzle (FZb) is Db, then this is set to Db<D0<Da. For example, outer diameter Db is set to 20 mm, inner diameter D0 to 22 mm, and outer diameter Da to 25 mm.

With the constitution of the opening and closing activation mechanism 40, in the state shown in FIG. 14, the fueling nozzle FZa is inserted in the insertion path 13P, and presses the pressing incline 53b of the introduction pressing part 53 of the nozzle detection member 51, as shown in FIG. 13, the detection support unit 52 elastic deforms while increasing the spring force as the center of the engaged claw 52a supported on the engaging part 13b of the aperture forming member 13. By doing this, as shown in FIG. 15, the lock member 61 moves in the outer periphery direction, the locked position is switched to the unlocked position by releasing the lock engaging part 61c of the lock member 61 from the locked part 62, in other words, the lock of the opening and closing member 21 of the flap valve mechanism 20 is released, and the opening operation of the opening and closing member 21 becomes possible. Note that for the inner diameter D0 of the insertion path 13P, even if it is a smaller diameter than the outer diameter Db of the gasoline fueling nozzle (FZb), as long as it is a diameter for which the lock will not be released when the tip outer periphery part of the fueling nozzle (FZb presses the pressing incline 53b and does not allow fueling, a small amount of dimensional range is allowed.

(3) Fuel Tank Opening and Closing Device Opening and Closing Operation (3)-1 Opening Operation As shown in FIG. 1, when the fueling lid FL is opened, the opening and closing device 10 placed inside the fueling chamber FR appears. As shown in FIG. 5, when the fueling nozzle FZ is inserted from the introduction port 13Pa of the aperture forming member 13, the tip of the fueling nozzle FZ reaches the introduction pressing part 53 of the nozzle detection mechanism 50, and presses the introduction pressing part 53, the pressing incline 53b receives the diameter direction force from the fueling nozzle FZ, as shown in FIG. 13 and FIG. 15, while the nozzle detection member 51 of the nozzle detection mechanism 50 is warped so that the spring force is accumulated, the engaged claw 52a opens and enlarges as the fulcrum point. When the nozzle detection member 51 opens and enlarges, the engaging cylindrical part 55 of the bottom part of the nozzle detection member 51 is moved in the outer diameter direction. By doing this, the lock member 61 is removed from the locked part 62, and this switches to the unlocked position and whereby the opening and closing member 21 opening operation is possible.

Furthermore, as shown in FIG. 8, when the fueling nozzle FZ is pressed in, the opening and closing member 21 of the flap valve mechanism 20 is pressed against the energizing force of the spring 33, and the opening and closing member 21 rotates with the support axis as the center, and the inlet 18Pa opens. At this time, as the degree of openness of the opening and closing member 21 becomes greater, while the tip of the fueling nozzle FZ follows the introduction guide surface 23b of the pressing member 22, the opening and closing member 21 opens. Then, the abutting part 27b of the valve positioning member 27 touches the inner wall of the connecting tube 12, and the opening operation of the opening and closing member 21 is completed. At this time, the outer peripheral part of the fueling nozzle FZ touches the positioning ridge line 23d of the pressing member 22, and the fueling nozzle FZ is positioned. In this state, fueling is done from the fueling nozzle FZ to the fuel path 11P.

(3)-2 Closing Operation

When fueling ends, and the fueling nozzle FZ is pulled out from the inlet 18Pa, the opening and closing member 21 of the flap valve mechanism 20 closes the inlet 18Pa by the restoration force of the spring 33, and furthermore, when the fueling nozzle FZ is pulled out, the nozzle detection member 51 and the lock member 61 return to the initial position, specifically, the introduction pressing part 53 returns to its original position by the elastic force of the detection support unit 52, and also, the lock member 61 moves to the center direction of the opening and closing member 21, and is engaged with the locked part 62. By doing this, the opening and closing member 21 returns to its closed initial state at the locked position of the lock member 61, and furthermore, the fueling lid FL (FIG. 1) is closed.

(4) Operation and Effect of the Fuel Tank Opening and Closing Device

The following operational effects are exhibited by the fuel tank opening and closing device 10 of the embodiment noted above.

(4)-1 As Shown in FIG. 8, the Fueling Nozzle FZ is Guided to the Insertion direction by the nozzle positioning guide mechanism, and furthermore, when it reaches the insertion completion position, it is positioned within the fuel path 11P. Specifically, the first support mechanism of the nozzle positioning guide mechanism, which is formed at the opening peripheral edge of the introduction port 13Pa, slides the outer periphery part of the fueling nozzle FZ, while guides the fueling nozzle FZ in the insertion direction. The second support mechanism guides the tip of the fueling nozzle FZ using the introduction guide surface 23b of the guide curved surface 23a, and opens the inlet 18Pa by the opening and closing member 21, and furthermore guides the fueling nozzle FZ. The third support mechanism positions the fueling nozzle FZ at the insertion completion position as the valve positioning member 27 of the opening and closing member 21 touches the inner wall of the tank opening forming member 11, and stops any opening operation greater than that. Therefore, the fueling nozzle FZ is supported by the three points, that is, a first point is how the nozzle locking part FZs of the outer peripheral part of the fueling nozzle FZ is positioned on the opening peripheral edge part (first support mechanism) of the introduction port 13Pa of the tank opening forming member 11, and a second point is how the top of the fueling nozzle FZ is positioned in the left and right direction in relation to the insertion direction by the positioning ridge line 23d (second support mechanism), and a three point is how the valve positioning member 27 of the opening and closing member 21 (third support mechanism) touches the inner wall of the tank opening forming member 11, and is positioned in the vertical direction in relation to the insertion direction.

Therefore, when inserting the fueling nozzle FZ in the fuel path 11P, the fueling nozzle FZ is guided without swaying until it reaches the insertion completion position after opening of the opening and closing member 21 from the insertion path 13P by the nozzle positioning guide mechanism, so it is possible to perform the insertion work smoothly and easily. In fact, the fueling nozzle FZ is positioned in relation to left and right and the vertical direction in relation to the insertion direction at three locations using the insertion completion position, so it is possible to do fueling of a suitable volume without imprudent operation of auto stop when fuel droplets or the like touch inside the fuel path 11P.

(4)-2 With this embodiment, because the nozzle stopper 13a is arranged on the outside from the inlet 18Pa, when a short fueling nozzle FZ is inserted in the fuel path 11P, the tip of the fueling nozzle FZ may not enter sufficiently to the depth position of the fuel path 11P, in other words, the fuel path 11P of the fuel tank side from the flap valve mechanism 20. To deal with such a case, even if a positioning member is provided for positioning the tip of the fueling nozzle FZ at the periphery of the flap valve mechanism 20, trouble occurs with the opening and closing operation of the opening and closing member 21, so it is not possible to provide a positioning member. However, with this embodiment, it is possible to reliably position the tip of the fueling nozzle FZ using the positioning ridge line 23d of the pressing member 22, so it is possible to make the constitution simple without needing to provide a separate positioning mechanism at the periphery of the flap valve mechanism 20.

(4)-3 As shown in FIG. 5 and FIG. 13, the nozzle detection mechanism 50 is equipped with an introduction pressing part 53 arranged so as to be pressed by the fuel nozzle FZ when the outer diameter of the tip of the fueling nozzle FZ is a specified diameter or greater, so in the case of a light oil fueling nozzle (FZa), the opening and closing member 21 of the flap valve mechanism 20 performs the opening operation, but in the case of the gasoline fueling nozzle (FZb), the opening and closing member 21 does not perform the opening operation. Therefore, when the type of fuel differs according to the outer diameter of the fueling nozzle FZ, even when the fueling nozzle FZ is erroneously inserted, the inlet 18Pa does not open, so the wrong type of fuel is not supplied.

(4)-4 The tank opening forming member 11 and the pressing member 22 are formed from conductive materials having conductivity, and constitute the grounding path to the car body side member of a vehicle. Specifically, as shown in FIG. 11 and FIG. 12, when the fueling nozzle is inserted in the insertion path 13P, and touches the pressing member 22, the fueling nozzle is connected to the grounding path to the car body side member via the discharge projection 23e that forms the second gap Gp2 narrower than the first gap GP1 between the outer periphery part of the pressing member 22 and the inner wall of the tank opening forming member 11, and furthermore via the tank opening forming member 11. Thus, even when static electricity is charged in the person holding the fueling nozzle, this is quickly removed through the grounding path. In this way, to ensure the grounding path of the fuel tank opening and closing device, the tip of the fueling nozzle uses the initial contact pressing member 22, so wiring a ground wire is not necessary, and the constitution becomes simple. Also, before the fueling nozzle opens the opening and closing member 21, since the fuel nozzle FZ touches the pressing member 22, there is also no discharging on the fuel tank side from the opening and closing member 21.

(4)-5 The tip of the discharge projection 23e and the discharge projection 15b of the aperture forming member 13 are sharpened, and in fact a plurality of discharge projections 15b are arranged along the outer form of the pressing member 22 along the discharge projection 23e, so the grounding path is reliably ensured.

(4)-6 For the grounding means, the pressing member 22 and the tank opening forming member 11 are formed using a conductive material, so the constitution is simple without arranging a separate conductive line in the vicinity of the inlet as was the case with the prior art, and without increasing the number of parts.

Note that this invention is not limited to the embodiment noted above, and it is possible to implement various modes in a range that does not stray from the spirit of the invention, and it is possible to have the following kind of variation as well, for example.

For the grounding means of the embodiment noted above, in addition to forming all of the pressing member using a conductive resin, it is also possible to form only the surface of the top surface part, or to do insertion formation of a metal thin plate or the like on the surface. Furthermore, the grounding path can be formed in a plurality of locations on the outer peripheral part of the pressing member 22 if it is a position for which discharge is possible in a state with the opening and closing member 21 closed.

Furthermore, with the embodiment noted above, we described a constitution equipped with a nozzle detection mechanism, but this is not limited to this, and it is also possible to apply this to a mechanism that is not equipped with a nozzle detection mechanism.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel tank opening and closing device for opening and closing a path for supplying fuel to a fuel tank, the fuel tank opening and closing device comprising:

a tank opening forming member that forms (i) a fuel path connected to the fuel tank, (ii) an insertion path for inserting as fueling nozzle, the insertion path having an introduction port and connecting the introduction port to the fuel path and (iii) an inlet disposed between the fuel path and the insertion path;

a flap valve mechanism that is arranged inside the tank opening forming member, and has an opening and closing member for opening and closing the inlet by being pressed by an end of the fueling nozzle and by pivoting about an axis of a spring biasing the opening and closing member toward closing; and a nozzle positioning guide mechanism that guides the fueling nozzle from the introduction port to an insertion completion position through the insertion path, the inlet opened by the opening and closing member in the fuel path, and positions the fueling nozzle at the insertion completion position, wherein the insertion completion position is a position at which fuel is supplied by the fueling nozzle into the fuel path, wherein the nozzle positioning guide mechanism includes:

a first support mechanism being formed on an opening peripheral edge of the introduction port, the first support mechanism guiding the fueling nozzle in an insertion direction while contacting with an outer periphery part of the fueling nozzle and positioning the fueling nozzle at the insertion completion position, a second support mechanism that has an introduction guide surface and a positioning ridge line formed on an upper surface of the opening and closing member respectively, wherein the introduction guide surface is a recess with a radius of curvature greater than a curvature of a radius of the fueling nozzle and conveys force in a direction for opening the opening and closing member while the end of the fueling nozzle slides thereon, and wherein the positioning ridge line is formed on a part of the introduction guide surface and contacts the outer periphery surface of the fueling nozzle at the insertion completion position, the positioning ridge line having almost the same curvature as the curvature of the radius of the fueling nozzle and positioning the end of the fueling nozzle in a horizontal direction, and the radius of curvature of the introduction guide surface extends in a plane that is parallel to the axis of the spring, a third support mechanism that is formed on the opening and closing member, and has a valve positioning member which regulates a degree of openness of the opening and closing member by touching an inner wall of the tank opening forming member at the insertion completion position, and the opening and closing member includes a pressing member receiving the pressure force of the fuel nozzle, a value chamber forming member forming a valve chamber with the pressing member, a pressure regulating valve housed in the value chamber and a sidewall in which a ventilation hole is formed to pass air to the pressure regulating valve.

2. The fuel tank opening and closing device in accordance with claim 1, wherein the first support mechanism has a nozzle stopper far engaging with a nozzle locking part projecting from the outer periphery part of the fueling nozzle.

3. The fuel tank opening and closing device in accordance with claim 2, wherein the valve positioning member has a curved abutting part that touches the inner wall of the tank opening forming member cylindrically formed.

4. The fuel tank opening and closing device in accordance with claim 3, further comprising an opening and closing activation mechanism which sets (i) a locked position which regulates an opening operation of the opening and closing member and (ii) an unlocked position which allows the opening operation of the opening and closing member when pressed by the fueling nozzle, wherein the opening and closing activation mechanism includes:

a nozzle detection mechanism that is arranged in the insertion path and has an introduction pressing part for receiving a moving force in the insertion direction by the fueling nozzle, and a lock mechanism that has a locking member which selectively takes the locked position and the unlocked position by engaging and disengaging with the opening and closing member, wherein the locking member moves from the locked position to the unlocked position by receiving a moving force of the introduction pressing part.

5. The fuel tank opening and closing device in accordance with claim 4, wherein the opening and closing member includes a pressing member for being pressed by the end of the fueling nozzle, and the pressing member and the tank opening forming member form a first gap and a second gap between an outer periphery part of the pressing member and an inner wall of the tank opening forming member in a closed state of the opening and closing member, wherein the second gap is formed to be narrower than the first gap by a discharge projection that projects from at least one of the inner wall of the tank opening forming member and the outer periphery part of the pressing member, wherein the second gap forms a part of a grounding path between the pressing member and the tank opening forming member.

6. The fuel tank opening and closing device in accordance with claim 2, further comprising an opening and closing activation mechanism which sets (i) a locked position which regulates an opening operation of the opening and closing member and (ii) an unlocked position which allows the opening operation of the opening and closing member when pressed by the fueling nozzle, wherein the opening and closing activation mechanism includes:

a nozzle detection mechanism that is arranged in the insertion path and has an introduction pressing part for receiving a moving force in the insertion direction by the fueling nozzle, and a lock mechanism that has a locking member which selectively takes the locked position and the unlocked position by engaging and disengaging with the opening and closing member, wherein the locking member moves from the locked position to the unlocked position by receiving a moving force of the introduction pressing part.

7. The fuel tank opening and closing device in accordance with claim 1, wherein the valve positioning member has a curved abutting part that touches the inner wall of the tank opening forming member cylindrically formed.

8. The fuel tank opening and closing device in accordance with claim 1, further comprising an opening and closing activation mechanism which sets (i) a locked position which regulates an opening operation of the opening and closing member and (ii) an unlocked position which allows the opening operation of the opening and closing member when pressed, by the fueling nozzle, wherein the opening and closing activation mechanism includes:

a nozzle detection mechanism that is arranged in the insertion path and has an introduction pressing part for receiving a moving force in the insertion direction by the fueling nozzle, and a lock mechanism that has a locking member which selectively takes the locked position and the unlocked position by engaging and disengaging with the opening and closing member, wherein the locking member moves from the locked position to the unlocked position by receiving a moving force of the introduction pressing part.

9. The fuel tank opening and closing device in accordance with claim 1, wherein the opening and closing member includes a pressing member for being pressed by the end of the fueling nozzle, and the pressing member and the tank opening forming member form a first gap and a second gap between an outer periphery part of the pressing member and an inner wall of the tank opening forming member in a closed state of the opening and closing member, wherein the second gap is formed to be narrower than the first gap by a discharge projection that projects from at least one of the inner wall of the tank opening forming member and the outer periphery part of the pressing member, wherein the second gap forms a part of a grounding path between the pressing member and the tank opening forming member.

10. A fuel tank opening and closing device for opening and closing a path for supplying fuel to a fuel tank, the fuel tank opening and closing device comprising:

a tank opening forming member including (i) a fuel path connected to the fuel tank, (ii) an insertion path configured to receive a fueling nozzle, the insertion path having an introduction port connecting to the fuel path, and (iii) an inlet disposed between the fuel path and the insertion path;

a flap valve mechanism being arranged inside the tank opening forming member, the flap valve having an opening and closing member configured to opening and closing the inlet when an end, of the fueling nozzle presses on the opening and closing member; and a nozzle positioning guide mechanism configured to guide the fueling nozzle from the introduction port to an insertion completion position through the insertion path, the inlet opened by the opening and closing member in the fuel path, and the nozzle positioning guide mechanism also configured to position the fueling nozzle at the insertion completion position, wherein the insertion completion position is a position at which fuel is supplied by the fueling nozzle through the fuel path, wherein the nozzle positioning guide mechanism includes:

a first support mechanism being arranged on an opening peripheral edge of the introduction port, the first support mechanism configured to guide the fueling nozzle in an insertion direction while contacting with an, outer periphery part of the fueling nozzle to position the fueling nozzle at the insertion completion position, a second support mechanism having an introduction guide surface and a positioning ridge line both formed on an upper surface of the opening and closing member, wherein the introduction guide surface has a concave surface with a curvature greater than a curvature of a radius of the fueling nozzle, the introduction guide surface is configured to convey force in a direction for opening the opening and closing member when the end of the fueling nozzle is slid thereon, and wherein the positioning ridge line is integrally formed as a part of the introduction guide surface and is configured to press against the outer periphery surface of the fueling nozzle at the insertion completion position, the positioning ridge line having a larger curvature than the curvature of the radius of the fueling nozzle, and the positioning ridge line positioning the end of the fueling nozzle in a horizontal direction, a third support mechanism, which is formed on the opening and closing member, having a valve positioning member that regulates a degree of openness of the opening and closing member by touching an inner wall of the tank opening forming member at the insertion completion position, and wherein the opening and closing member includes a pressing member receiving the pressure force of the fuel nozzle, a valve chamber forming member forming a valve chamber with the pressing member, a pressure regulating valve housed in the valve chamber, and a sidewall in which a ventilation hole is formed to pass air to the pressure regulating valve.

11. The fuel tank opening and closing device in accordance with claim 10, wherein the first support mechanism has a nozzle stopper for engaging with a nozzle locking part projecting from the outer periphery part of the fueling nozzle.

12. The fuel tank opening and closing device in accordance with claim 11, wherein the valve positioning member has a curved abutting part that touches the inner wall of the tank opening forming member cylindrically formed.

13. The fuel tank opening and closing device in accordance with claim 12, further comprising an opening and closing activation mechanism which sets (i) a locked position which regulates an opening operation of the opening and closing member and (ii) an unlocked position which allows the opening operation of the opening and closing member when pressed by the fueling nozzle, wherein the opening and closing activation mechanism includes:

a nozzle detection mechanism that is arranged in the insertion path and has an introduction pressing part for receiving a moving force in the insertion direction by the fueling nozzle, and a lock mechanism that has a locking member which selectively takes the locked position and the unlocked position by engaging and disengaging with the opening and closing member, wherein the locking member moves from the locked position to the unlocked position by receiving a moving force of the introduction pressing part.

14. The fuel tank opening and closing device in accordance with claim 13, wherein the opening and closing member includes a pressing member for being pressed by the end of the fueling nozzle, and the pressing member and the tank opening forming member form a first gap and a second gap between an outer periphery part of the pressing member and an inner wall of the tank opening forming member in a closed state of the opening and closing member, wherein the second gap is formed to be narrower than the first gap by a discharge projection that projects from at least one of the inner wall of the tank opening forming member and the outer periphery part of the pressing member, wherein the second gap forms a part of a grounding path between the pressing member and the tank opening forming member.

15. The fuel tank opening and closing device in accordance with claim 14, wherein the pressing member and the tank opening forming member are formed from conductive resin.

16. The fuel tank opening and closing device in accordance with claim 11, further comprising an opening and closing activation mechanism which sets (i) a locked position which regulates an opening operation of the opening and closing member and (ii) an unlocked position which allows the opening operation of the opening and closing member when pressed by the fueling nozzle, wherein the opening and closing activation mechanism includes:

a nozzle detection mechanism that is arranged in, the insertion path and has an introduction pressing part for receiving a moving force in the insertion, direction by the fueling nozzle, and a lock mechanism that has a locking member which selectively takes the locked position and the unlocked position by engaging and disengaging with the opening and closing member, wherein the locking member moves from the locked position to the unlocked position by receiving a moving force of the introduction pressing part.

17. The fuel tank opening and closing device in accordance with claim 10, wherein the valve positioning member has a curved abutting part that touches the inner wall of the tank opening forming member cylindrically formed.

18. The fuel tank opening and closing device in accordance with claim 10, further comprising an opening and closing activation mechanism which sets (i) a locked position which regulates an opening operation of the opening and closing member and (ii) an unlocked position which allows the opening operation of the opening and closing member when pressed by the fueling nozzle, wherein the opening and closing activation mechanism includes a nozzle detection mechanism that is arranged in the insertion path and has an introduction pressing part for receiving a moving force in the insertion direction by the fueling nozzle, and a lock mechanism that has a locking member which selectively takes the locked position and the unlocked position by engaging and disengaging with the opening and closing member, wherein the locking member moves from the locked position to the unlocked position by receiving a moving force of the introduction pressing part.

19. The fuel tank opening and closing device in accordance with claim 10, wherein the opening and closing member includes a pressing member for being pressed by the end of the fueling nozzle, and the pressing member and the tank opening forming member form a first gap and a second gap between an outer periphery part of the pressing member and an inner wall of the tank opening forming member in a closed state of the opening and closing member, wherein the second gap is formed to be narrower than the first gap by a discharge projection that projects from at least one of the inner wall of the tank opening forming member and the outer periphery part of the pressing member, wherein the second gap forms a part, of a grounding path between the pressing member and the tank opening forming member.

20. A fuel, tank opening and closing device in accordance with claim 19, wherein the pressing member and the tank opening forming member are formed from conductive resin.

* * * * *